United States Patent [19]

Nimtz

[11] Patent Number: 4,844,389
[45] Date of Patent: Jul. 4, 1989

[54] ONE-PIECE HAMMER STRAP AND METHOD OF USING SAME

[76] Inventor: Brian A. Nimtz, P.O. Box 712, Los Alamos, Calif. 93440

[21] Appl. No.: 213,340

[22] Filed: Jun. 30, 1988

[51] Int. Cl.$^4$ ............................................. F16B 15/00
[52] U.S. Cl. ..................... 248/71; 248/74.3; 24/20 R
[58] Field of Search ............... 248/62, 65, 71, 74.1, 248/74.2, 74.3, 74.4, 316.1, 505, 499; 24/20 R, 20 EE, 23 R, 23 B, 23 W, 23 EE, 457, 484, 339, 340

[56] References Cited

U.S. PATENT DOCUMENTS

| 2,279,090 | 4/1942 | Markey | 248/74.3 |
| 2,972,461 | 2/1961 | Balbach | 248/74.1 |
| 2,999,661 | 9/1961 | Shuter | 248/62 |
| 3,353,775 | 11/1967 | Sebo | 248/74.4 |
| 3,363,865 | 1/1968 | Metsker | 248/74.1 |

FOREIGN PATENT DOCUMENTS

| 498415 | 10/1950 | Belgium | 248/71 |
| 1123377 | 2/1962 | Fed. Rep. of Germany | 248/74.4 |
| 694227 | 12/1930 | France | 248/71 |
| 64328 | 11/1955 | France | 248/74.1 |
| 1124412 | 10/1956 | France | 248/74.4 |
| 1164766 | 10/1958 | France | 248/74.1 |

Primary Examiner—Ramon O. Ramirez
Assistant Examiner—Robert A. Olson
Attorney, Agent, or Firm—Robert O. Nimtz

[57] ABSTRACT

A one-piece hammer strap is disclosed for attaching ductwork to the superstructure of a building. The hammer strap comprises a baseplate, a strap and a fastening device. The strap is attached at one end to the baseplate, threaded around the ductwork and through a slot in the baseplate. The strap can be bent at the slot to firmly grasp the ductwork. The hammer strap can be attached to the superstructure prior to the installation of the ductwork, using the fastening device. The one-piece hammer straps, and the method of using such hammer straps to install ductwork, allow a single installer to install the ductwork without the need for an assistant.

3 Claims, 2 Drawing Sheets

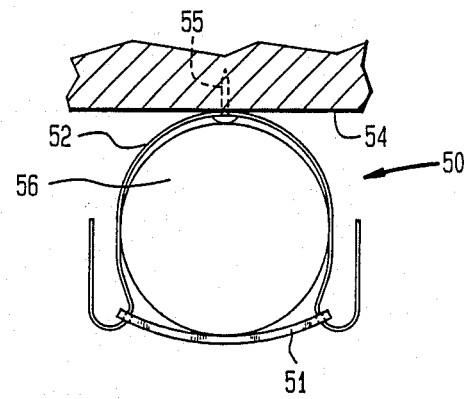
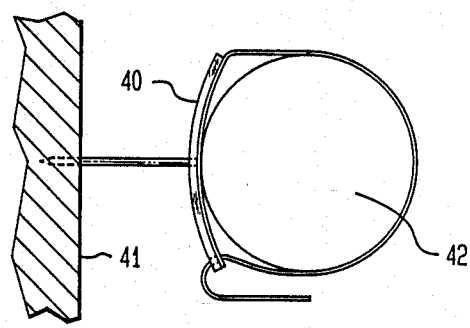
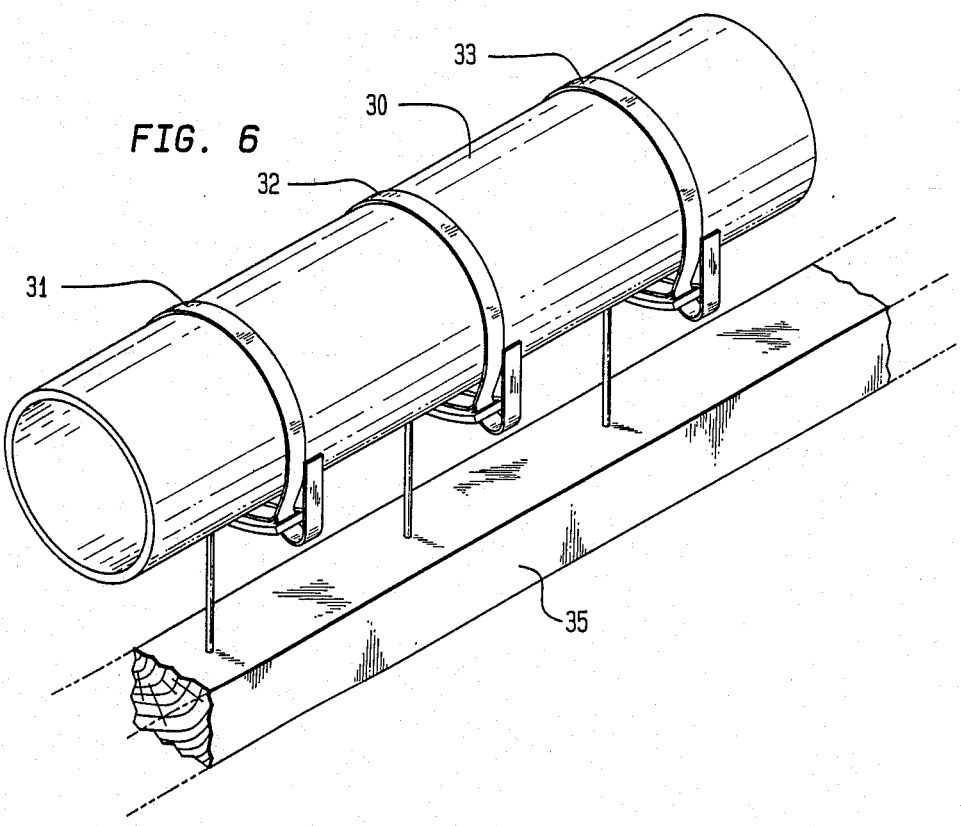

ONE-PIECE HAMMER STRAP AND METHOD OF USING SAME

TECHNICAL FIELD

This invention relates to the rapid and efficient installation of hot and cold air distribution systems including circular or rectangular ducts and, more particularly, to one-piece hammer straps for use in such installations.

BACKGROUND OF THE INVENTION

The construction of new buildings and the renovation of older buildings has often required the installation of numerous ducts for heating and air conditioning throughout the building. These ducts are either fastened to, or suspended from, the superstructure of the building, usually in attic, basement or utility spaces. The devices used for fastening and suspending such ducts have been numerous and varied. One of the major difficulties encountered in the use of such devices, however, has been the difficulty preassembling sections of duct to be installed and installing the fastening devices in the precise positions necessary properly to locate the duct assembly. Furthermore, it has usually been necessary to provide ancillary fastening devices such as nails, screws and bolts, in order to use the primary fastening devices. Finally, most such fastening devices, once in place, are semi-permanent, requiring extensive effort to adjust or remove if the initial installation proves to be incorrect.

It would therefore be desireable to provide a one-piece device, installable separately prior to the installation of the duct itself, and readily adaptable to the installation of large sections of duct assembled at a more convenient work location. Moreover, it would likewise be desirable to provide a single style of fastening device for sheet metal ducts regarless of the orientation of the fastening device. Finally, it would also be desirable to provide a readily adjustable, esily detachable and reusable fastening device for such ducts in the event of incorrect initial installation.

SUMMARY OF THE INVENTION

In accordance with the illustrative embodiments of the present invention, a universal holding device is provided which can be supplied in one piece and which can be used to fasten large sections of sheet metal ducts to the superstructure of a building. More particularly, a base plate, generally conforming in shape to the outer shape of the duct to be installed, is attached to a horizontal surface in the utility space of a building. A section of duct can then be laid on top of the base plate. An adjustable sheet metal strap, attached at one end to one end of the base plate, is then threaded around the duct and through a slot at the other end of the base plate. The flexible strap can then be pulled tight through the slot so as to grasp the enclosed duct and then locked into position by bending the adjustable strap at the slot in the base plate.

The major advantage of the duct attachment device in accordance with the present invention is the ability to install a large number of such devices along the ultimate path of the duct, and then to assemble the duct into long sections, possibly insulated, and to install such long sections in one piece by the simple expedient of laying the assembled duct on the top of the installed one-piece devices, hereinafter termed "hammer straps," Thereafter, the free end of the strap is inserted through the slot, pulling the strap tight around the duct and bending the strap at the slot to hold it in place. Removal of the duct is readily accomplished by unbending the strap and, loosening the strap from around the duct, and removing or repositioning the thus freed duct. The hammer strap itself can be readily removed to be reused in another location.

Sheet metal ducts of differing cross-sections are readily accommodated by different base plates of matching shape, recognizing that different sizes of duct can be accommodated with a single size of base plate. Indeed, a single, flat base plate can be used for all sizes of rectangular ducts.

In accordance with another species of the present invention, the base plate can be slotted at both ends and the strap threaded around the duct and through both ends of the base plate. Bending the strap at both ends then completes the installation. This latter species of the invention is especially adapted for installations requiring suspension of the ductwork from an overhead portion of the superstructure where gravity cannot be relied on to hold the duct in place while the straps are threaded and bent.

BRIEF DESCRIPTION OF THE DRAWINGS

A complete understanding of the present invention may be gained by considering the following detailed description in conjunction with the accompanying drawing, in which:

FIG. 6 shows how a plurality of the devices shown in FIG. 5 might be used to support a long section of preassembled ductwork;

FIG. 7 shows how the fastening device of FIG. 5 might be used to attach a duct to a vertical surface in the building superstructure; and FIG. 8 shows how a fastening device having a base plate with slots at both ends might be used to suspend a duct from the underside of a horizontal surface in the building superstructure.

To facilitate reader understanding, identical reference numerals are used to designate elements common to the figures.

DETAILED DESCRIPTION

Figure 1:
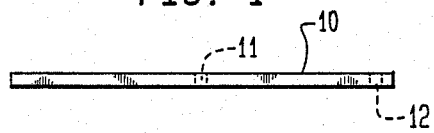
FIG. 1 shows an edge view of a flat baseplate which forms one part of the device of the present invention.
Figure 2:
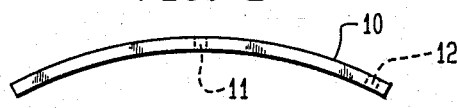
FIG. 2 shows an edge view of a curved baseplate which also forms one part of the device of the present invention.
Figure 3:
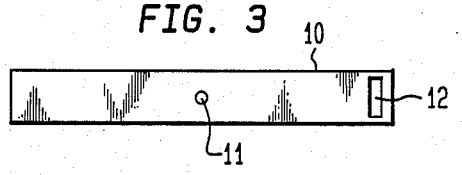
FIG. 3 shows a plan view of the baseplates of FIGS. 1 or 2.

Referring more particularly to FIG. 1, there is shown an edge view of a baseplate 10. Baseplate 10 has a round hole 11 bored therein and suitable for receiving a fastening device such as a nail. Baseplate 10 also has a rectangular slot 12 cut in one end thereof for receiving a strap, to be described. If baseplate 10 is to be used with a round duct, it can be bent into an arcuate shape as shown in FIG. 2, having a radius of curvature larger that the radius of the largest sized duct expected to be used therewith. FIG. 3 shows a plan view of the baseplates illustrated in edge view in FIGS. 1 and 2.

The base plates of FIGS. 1, 2 and 3 can, for example, be stamped out of one-quarter inch thick sheet metal stock and, for typical duct sizes, be approximately two inches in width and six inches in length. It is to be understood, of course, that these dimensions are merely illustrative, and appropriate dimensions for any particular application can readily be devised and substituted for these values. Indeed, it may be desirable to stock a variety of sizes of devices in accordance with the present invention to accommodate the duct sizes most likely to be encountered. The flat base plate of FIG. 1 would, of course, be used with rectangular ducts having flat sides.

Figure 4:
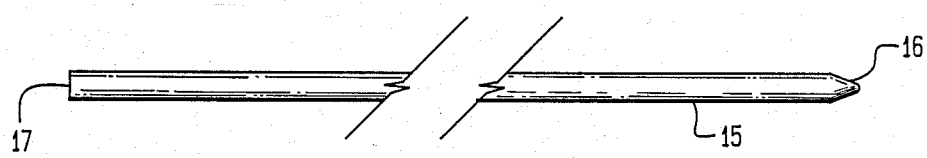
FIG. 4 shows a plan view of a flexible strap which forms another part of the present invention.

In FIG. 4, there is shown a plan view of a strap 15 of any desired length (and hence shown broken in length) and of a width to fit into the slot 12 of FIGS. 1, 2 and 3. Strap 15 may, for example, comprise a one inch wide strap of 26-gauge sheet metal and may have one end 16 cut to a double taper to facilitate threading through slot 12. Again, the size of strap 15, while it must related to the size of baseplate 10 in FIGS. 1-3, can be of any size suitable for the particular duct sizes to be installed.

Figure 5:
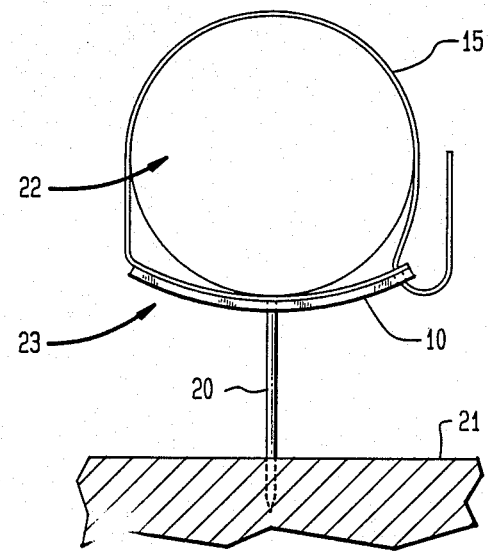
FIG. 5 shows a assembled view of a one-piece adjustable fastening device (a hammer strap) in accordance with the present invention.

Baseplate 10 and strap 15 are preassembled into a one-piece hammer strap as shown in FIG. 5 by the following procedure. A nail 20, which may, for example, comprise a galvanized spike such as is used to attach gutters to the eaves of a building, is threaded through the hole 11 in baseplate 10, with the point of the nail 20 away from the center of curvature of baseplate 10 and the head of nail 20 resting against the inner surface of baseplate 10. The blunt end 17 of strap 15 is then laid adjacent to the slot 12 of baseplate 10 with the tapered end 16 of strap 15 pointing away from slot 12. The strap 15 is then fastened to the inner surface of baseplate 10 so as to capture the head of nail 20 between strap 15 and baseplate 10. Spot-welding is one relatively inexpensive process for attaching strap 15 to baseplate 10, taking care to insure a tight and strong attachment in the vicinity of the head of nail 20. The resulting assembly has been termed a hammer strap for the purposes of this invention since it can be hammered into a supporting surface (such as surface 21 in FIG. 5) prior to the attachment of a round duct such as duct 22. Once the hammer strap assembly (reference numeral 23 in FIG. 5) is firmly attached to the surface 21, the duct 22 can be laid on the top of baseplate 10 and strap 15 threaded around duct 22, through slot 12 and bent to tightly secure the duct 22 to hammer strap assembly 23. The use of a plurality of hammer straps to fasten a long assemblage of duct sections is shown in FIG. 6.

Referring more particularly then to FIG. 6, there is shown a long assemblage 30 of round duct sections which may be insulated prior to installation. A plurality of hammer straps 31, 32, . . . , 33 are first pounded into wooden horizontal superstructure beam element 35. Due to the preassembly of the hammer straps 31-33, a single installer can readily hammer these hammer straps 31-33 into beam 35 along the intended path of duct assemblage 30. Thereafter, the preassembled section 30 of duct is laid on the baseplates of the hammer straps 31-33 and the strap portion threaded around the duct assemblage 30, through the slots 12 in the baseplates, and bent to firmly secure the duct assemblage 30 to the hammer straps 31-33.

It will be apparent from the installation procedure described above that a single installer can readily install hot or cold air ducts with relative ease and efficiency using the hammer straps in accordance with the present invention. Prior art methods for installing ducts, usually involving straps cut to length on the job and nailed at both ends to the undersurface of the superstructure elements, required at least two workmen, one to hold the duct in position and the other to nail the down the ends of the straps. A further benefit arising from the use of hammer straps in accordance with the present invention is the ability to install the duct in straighter sections, thus reducing the air drag inside the duct and hence the fan power required to force hot or cold air through the ducts.

As can be seen in FIG. 7, a hammer strap such as hammer strap 40 can be used on a vertical surface 41 to attach a duct 42 to the vertical surface 41. Duct 42 can be extending horizontally, as a portion of a distribution system, or vertically, as a portion of a chimney or venting system.

When the hammer straps of the present invention are used to suspend ducts from the underside of horizontal surfaces, as shown in FIG. 8, a modification in the construction of the hammer strap is sometimes helpful. As shown in FIG. 8, the hammer strap 50 includes a baseplate 51 with rectangular slots at both ends. The strap portion 52 of hammer strap 50 is tapered at both ends to that each end can be threaded through one of the slots in baseplate 51. The strap 52 is initially attached at a central location to the underside of horizontal surface 54 by means of a nail 55 driven therethrough. Duct 56 is then placed against strap 52, baseplate 51 placed against the under surface of duct 56, and the tapered ends of straps 52 threaded through the slots at the ends of baseplate 51. The ends of straps 52 can then be pulled tight and bend so as to firmly hold duct 56 in position. The baseplate 51 can be attached to strap 52 for ease in handling by threading one end of strap 52 through one slot in baseplate 51 and temporarily bending strap 52 so as to secure baseplate 51. In this way, modified hammer strap 50 of FIG. 8 can also be sold and handled as a one-piece device for ease in storage and use.

It should also be clear to those skilled in the art that further embodiments of the present invention may be made by those skilled in the art without departing from the teachings of the present invention.

What is claimed is:

1. A one-piece device for attaching air ducts to the superstructure of a building comprising
  a baseplate shaped to conform to the external shape of the ducts and including at least one rectangular slot,
  a strap for permanent attachment at one end to said baseplate, for extension around said ductwork, and for insertion through said slot, and
  an elongated hammer-drivable spike having a head, an elongated body portion and a sharpened end portion opposite said head, said head being captured between said baseplate and said strap when said strap is permanently attached to said baseplate, said spike being used for attaching said baseplate device to said superstructure at a substantial distance away from said superstructure.

2. The one-piece device according to claim 1 further including
  a plurality of spot welds for attaching said strap to said baseplate.

3. A method of installing air ducts into the superstructure of a building comprising the steps of
  assembling at least one baseplate shaped to conform to the external shape of the ducts and including at least one rectangular slot, a strap for permanent attachment at one end to said at least one baseplate, and an elongated hammer-drivable spike having a head, an elongated body portion and a sharpened end portion opposite said head, said head being captured between said baseplate and said strap when said strap is permanently attached to said baseplate, said assemblage comprising a one-piece holding device for holding said ducts spaced away from said superstructure, installing at least one of said holding devices along the intended path of said ducts to provide at least one baseplate spaced away from said superstructure by one of said fastening devices, assembling a plurality of sections of said air ducts into a duct assemblage, placing said duct assemblage in contact with said holding device, threading at least one end of said straps around said duct assemblage and through a slot in at least one end of said baseplate, pulling said strap tightly around said duct assemblage and bending said one end of said strap at said slot to hold said duct assemblage firmly in position.

* * * * *